United States Patent [19]
Johnson et al.

[11] Patent Number: 6,085,031
[45] Date of Patent: Jul. 4, 2000

[54] METHOD AND SYSTEM FOR SEGMENTING AN AUDIO OBJECT ACCORDING TO A SPECIFIED PROFILE INTO A FOLDER STRUCTURE

[76] Inventors: William J. Johnson, 1445 Sodalic Dr., Flower Mound, Tex. 75028; Marvin Williams, 209 Woody Tr., Hickory Creek, Tex. 75065; Greg Fitzpatrick, 1527 Sweetgun Cir., Keller, Tex. 76248

[21] Appl. No.: 08/850,551

[22] Filed: May 2, 1997

Related U.S. Application Data

[63] Continuation of application No. 08/354,335, Dec. 13, 1994, abandoned.

[51] Int. Cl.$^7$ ............................................. G06F 3/14
[52] U.S. Cl. .................. 395/340; 395/776; 395/788; 395/784; 395/807; 395/332; 395/348; 395/356
[58] Field of Search ........................... 395/776, 788–784, 395/807, 332, 340, 356, 348

[56] References Cited

U.S. PATENT DOCUMENTS

| | | | |
|---|---|---|---|
| 4,792,937 | 12/1988 | Picard | 369/59 |
| 5,065,347 | 11/1991 | Pajak | 395/159 |
| 5,101,345 | 3/1992 | MacPhail | 395/600 |
| 5,162,992 | 11/1992 | Williams | 364/419 |
| 5,251,315 | 10/1993 | Wang | 395/600 |
| 5,299,123 | 3/1994 | Wang et al. | 364/419.1 |
| 5,412,776 | 5/1995 | Bloomfield | 395/160 |
| 5,414,808 | 5/1995 | Williams | 395/154 |
| 5,450,314 | 9/1995 | Kagami et al. | 364/148 |
| 5,465,327 | 11/1995 | Wang et al. | 395/329 |
| 5,485,175 | 1/1996 | Suzuki | 395/353 |
| 5,504,850 | 4/1996 | Schuur et al. | 395/356 |
| 5,590,264 | 12/1996 | Keane et al. | 395/340 |
| 5,617,527 | 4/1997 | Kressin et al. | 395/326 |

*Primary Examiner*—Thomas G. Black
*Assistant Examiner*—Jean R. Homere
*Attorney, Agent, or Firm*—Gunn & Associates, P.C.

[57] ABSTRACT

A method and apparatus for automatically decomposing an audio object into a relational structure develops a hierarchically arranged folder. A user defines a characteristic of interest and the system locates each occurrence of the characteristic within the object. Each occurrence of the specified characteristic is separated from an adjacent occurrence by a segment of the object, thereby defining a segment length. A set of user defined isochronous transposition rules then arranges the segment lengths as a hierarchical folder structure.

4 Claims, 5 Drawing Sheets

METHOD AND SYSTEM FOR SEGMENTING AN AUDIO OBJECT ACCORDING TO A SPECIFIED PROFILE INTO A FOLDER STRUCTURE

This application is a continuation of application Ser. No. 08/354,335 filed Dec. 13, 1994, now abandoned.

FIELD OF THE INVENTION

The present invention relates generally to the field of data processing systems, and in particular to a method of, and apparatus for, segmenting a digital audio signal or object into segments based upon user defined characteristics of the signal and further arranging the segmented audio signal into a folder structure.

BACKGROUND OF THE INVENTION

Recent advances in multimedia-based editors have caused an explosion in the distribution of multimedia objects. Today, audio messages can be distributed and received in the same manner as text-based objects. Yet, certain characteristics of audio objects may be used to differentiate between these objects. In particular, audio objects are isochronous in nature, i.e., time-varying data characteristics of the objects convey information. It is necessary for audio objects to be played at a particular rate in order for the information to be conveyed accurately.

Known systems have addressed methods for developing logical relationships between objects. Some prior art systems provide a means for establishing "folder-like" relationships between objects, even objects that are of differing media types. For example, IBM's Document Interchange Architecture (DIA) describes a method for modeling object relationships as folder and staple constructs. The DIA document structure provides a set of descriptors for each document filed in a library. These descriptors are placed in document profiles and are filed with the documents. The document profiles contain parameters identifying the contents of the documents, such as the name under which it is filed, the authors, the subject it covers, and the date it was filed in the document library.

DIA allows for associating separate objects, such as video, audio, text, etc., as a folder or a staple construct. A folder document is created when a user groups documents into a linear or hierarchical structure. The staple relationship allows a user to attach two documents together. However, often a user desires to reorganize a single object to create a folder or staple construct, rather than associating separate objects into one construct. Prior techniques included cut-and-paste methods to create multiple objects from a single object to establish logical relationships.

Although prior art allowed for decomposition, these cut-andpaste techniques were directed toward textual based objects. Thus, there remains a need for a system and method to decompose an audio message into logical components for simpler comprehension. A user would find particularly useful a method for labeling and organizing different and even overlapping segments within a single audio message. Users desire a mechanism for which the segments of a single audio object can be automatically decomposed and rearranged into a logical relational/hierarchical structure.

SUMMARY OF THE INVENTION

The present invention provides a method and apparatus by which an audio object can be automatically segmented according to a specified profile into a folder structure. It should be noted that the term folder is used herein to designate any object relationship, network, whether hierarchical or relational, for which a logical association can be established. In particular, this invention addresses methods for handling the isochronous characteristics of a single audio object to create a folder entity.

The preferred embodiment of the present invention is a Folder Profile that allows a user to specify defaults for the decomposition of an audio object. Those skilled in the art will recognize that audio can be segmented according to defined time intervals, amplitude differentiation, sample rate, frequency modulation and other attributes of sound. In addition, particular characteristics of the audio can be selectively identified by the user.

For example, a user may select the audio segment for which his first line manager spoke and select the segments that second and third line managers spoke within an audio presentation. The user may desire that these audio segments be organized in a fashion similar to the hierarchical positions of the managers. These portions can be explicitly designated by the user to be included as components for folder construction.

More importantly, the user can specify Isochronous Transposition Rules (ITRs) for the relational objects. These rules allow the user to specify that relative location of selected audio segments that determines how the segments will be related within a logical relational construct. For example, a user may desire that a hierarchical folder structure be based on the occurrence of the objects within the audio presentation. This can imply that the first segment that occurs within the object, must be at the top of the hierarchical structure. The creation of children entities can then be based on the time interval between segment markers.

There are two basic functions that this invention provides: (1) to identify and create segments within an undifferentiated audio object (the segments are themselves folder structures), or to enable a user to identify audio objects and thereby create relationships among the segment objects,; and (2) whether the segments are created by the present invention or the user, the present invention also develops folder-like relationships among the segments.

Those of skill in the art will immediately recognize that there are an endless number of algorithms for rules that a user could apply to break up an object into segments. For example, such rules could include time offsets, characteristics of the object itself, such as frequency (pitch), amplitudes, etc. The following detailed description is intended to cover any set of segmenting rules that could logically be applied to an audio object, and the like.

As used herein, the term "folder structure" is an abstraction in the sense that it defines a relationship between two objects, for example. The folder-structure is implemented as a common identifier between objects. A folder structure may be either a common identification, such as an identical or related digit string, or a pointer (address) from one object to another. Further, another attribute decides the direction of the relationship, such as A containing B, or B containing A (i.e., which is the folder, which is the contained). Thus, a folder structure includes a linking field, a linking unique identifier or pointer, and a directional element which points up and down the hierarchy.

The present invention splits an object into a plurality of segments, each of which is an object, and develops the folder relationships between the created segments. On the other hand, the segments may all turn out to be peers, and no one segment fit within another segment.

As used herein, a "folder profile" is a file in non-volatile memory that defines rules or heuristics. These rules may be referred to as isochronous transposition rules, or ITRs. These rules describe what characteristics of an audio signal are of interest, defined by a user, such as pitch, frequency, volume, etc.

These and other features and objects of the present invention will be apparent to those of skill in the art from a review of the following detailed description along with the drawing figures.

BRIEF DESCRIPTION OF THE DRAWINGS

For a more complete understanding of the present invention and the features and advantages thereof, reference is now made to the Detailed Description in conjunction with the attached Drawings, in which.

DETAILED DESCRIPTION OF A PREFERRED EMBODIMENT

Figure 1:
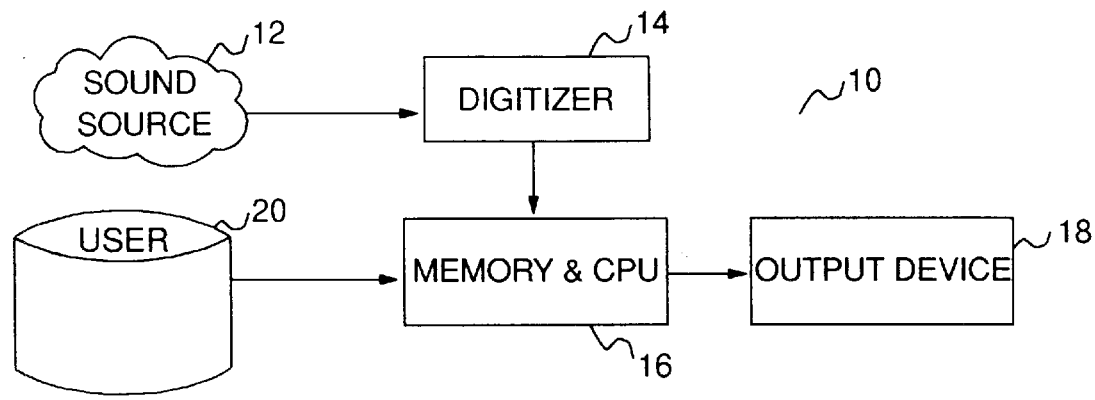
FIG. 1 is a schematic diagram of a system for storing and processing an audio object according to the present invention.

FIG. 1 depicts a system 10 in which the present invention may find application. A sound source 12, such as a microphone, sound recording, or the like, provides a time varying signal to a digitizer 14. The digitizer 14 develops a sequence of bits that is thereafter stored in a memory 16 for manipulation. The digital form of the audio signal stored in the memory may also be provided to an output device 18 to develop a visibly or audibly perceivable display of the original sound.

Figure 2:
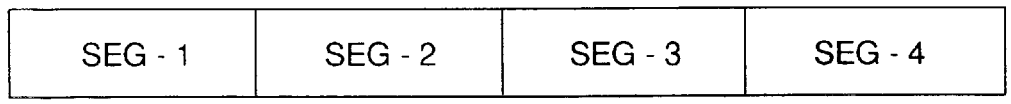
FIG. 2 is a schematic representation of a segmented memory portion.
Figure 3:
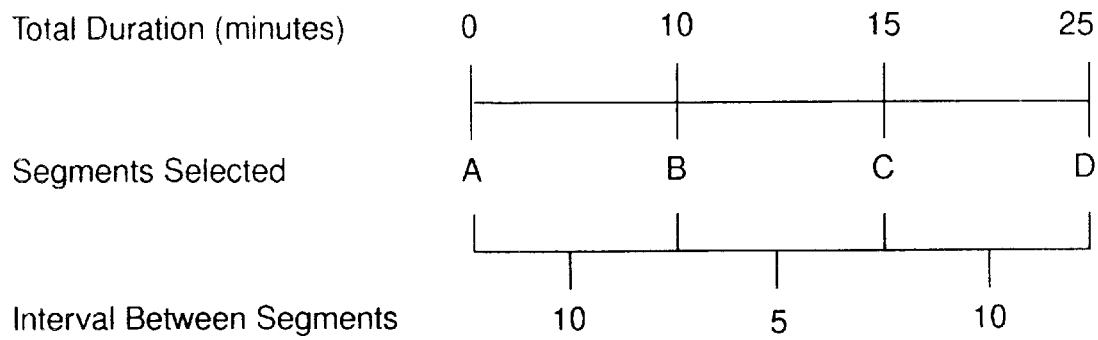
FIG. 3 is a plot of one example of a time duration characteristic used as the criterion for segmenting an audio object.

The digital form of the signal or message is stored in the memory as shown in FIG. 2. The message comprises a series of segments SEG-1, SEG-2, etc., segmented as defined by a user 20. FIG. 3 depicts a specific segmentation scheme by time duration as selected by the user 20.

FIG. 3 shows the relative positions of the segments to each other within an audio presentation. In this example, a user selected four audio segments, A, B, C, and D, where A and B are 10 minutes apart. B and C are five minutes apart and C and D are 10 minutes apart. The user can specify an ITR for which segments with an interval of less than ten minutes from each other are designated as siblings (children) of the previous parent. Segments of ten minutes or more are then designated as parents.

Users do not have to be cognizant of segment locations within an audio presentation at the time of selection. This allows users to select interesting segments in any order, yet have the segments organized in a predefined folder structure. The isochronous relationship of the segments to each other determines the folder relationships.

Figure 4:
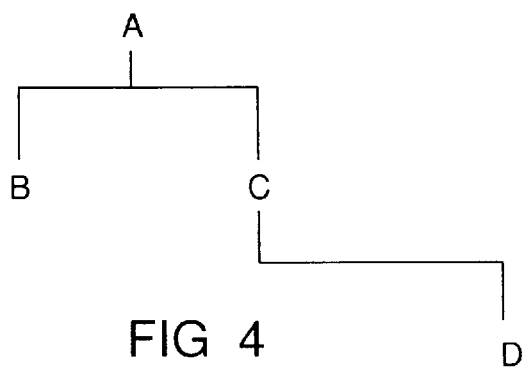
FIG. 4 is a plot of the hierarchical structure that results from the segmenting and folder implementation of the example of FIG. 3.

Based on the example criteria of FIG. 3, FIG. 4 depicts the automatic hierarchical folder structure. As shown, B and C are the children of A, since B occurs ten minutes after A. C is a sibling of B because C occurs five minutes after B. D is a child of C due to the ten minute interval that it occurs after C. Those skilled in the art recognize that a plurality of rules can be specified to create a multiplicity of structures. Moreover, specifications for location of a segment can be based upon the beginnings of the segments, the endings of the segments, or any attributes of the segment, such as amplitude, pitch, frequency, etc.

Once a user has specified a characteristic to automatically define segments, a Folder Construction Engine invokes the Isochronous Transposition Rules. Segments meeting the user's criteria are organized in their appropriate logical position of the folder structure. Actual folder construction can be built by a series 3 of pointers identifying each segment or by physically copying the segments into a separate folder entity. User selected segments that do not meet the user's criteria for folder construction can be arranged to the structure according to default specifications or by locating such segments into a separate object or objects.

Figure 5A:
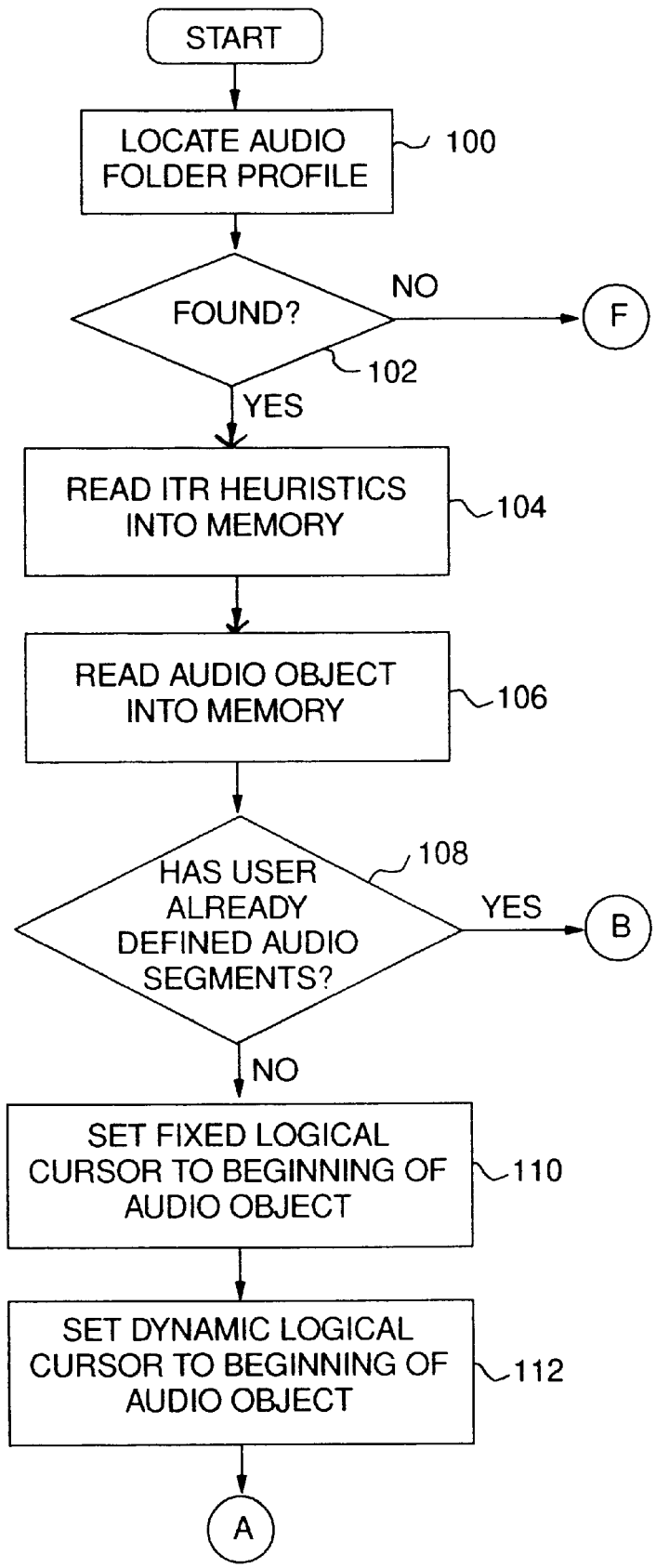
FIGS. 5A, 5B, and 5C depict a logic flow diagram of an implementation of the method of the present invention of segmenting and arranging the folder structure of an audio object.
Figure 5B:
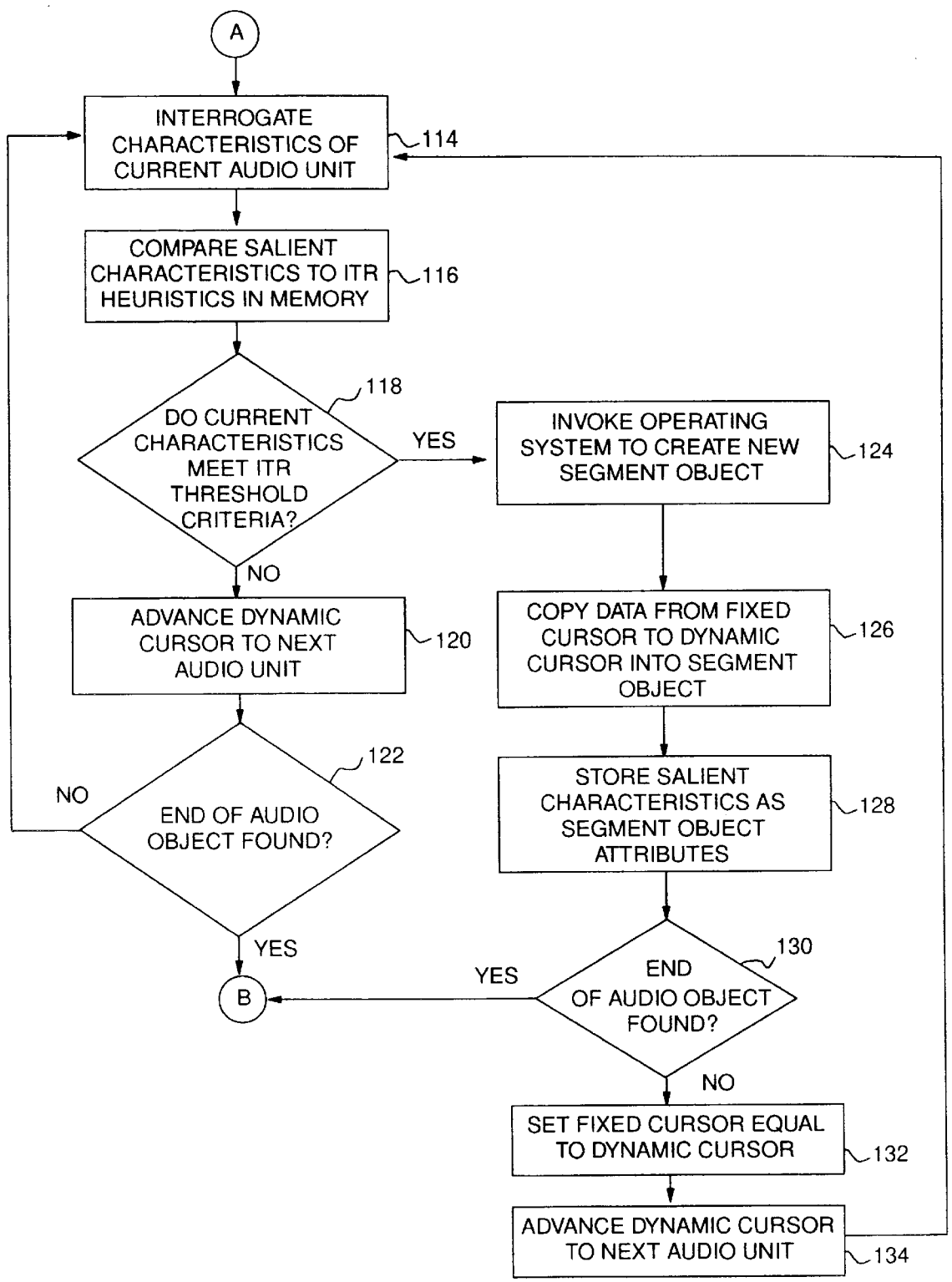
Figure 5C:
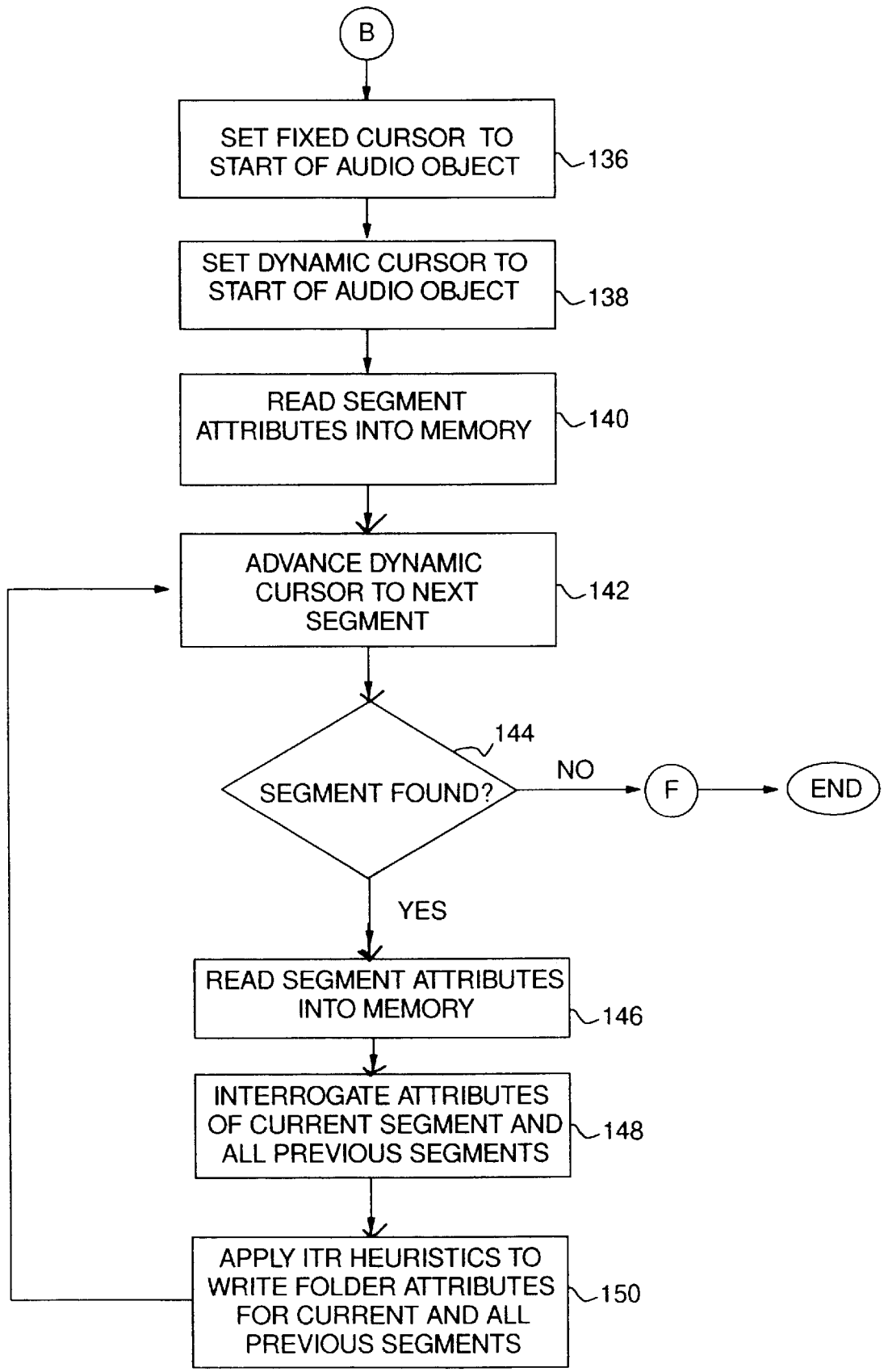

Referring now to FIGS. 5A, 5B, and 5C, the method of the present invention begins with step 100, which simply locates the object on the system that contains the rules or ITRs. In step 102, if no profile has been defined, the process simply stops. If a folder profile is found, then the previously defined rules are read into memory in step 104. Next, in step 106, the digital audio object is read into memory, or if already memory resident, the beginning of the audio object is identified.

In step 108, a determination is made as to whether or not the user has already defined the segments of the audio object based upon any identifiable characteristic. If the object has already been segmented, the process continues with FIG. 5C. If not, the process continues with the first of the two features of the present invention by performing the segmenting function. This is begun by setting the fixed and dynamic logical cursors or pointers to the beginning of the audio object in steps 110 and 112. From there the process continues with FIG. 5B.

Step 114 interrogates the characteristics of the current audio unit, which may be as small as a single sample. Step 116 is a comparison of the characteristics of the particular audio signal with the previously defined rules. Once this comparison is done, decision step 118 determines if any of the characteristics of the sample under consideration meet any of the ITR criteria, such as pitch, duration, rate of change of a characteristic, and the like. If no match is made, the process advances the dynamic cursor to the next sample for review in step 120. Once the end of the audio object has been reached, decision step 122 continues the process with the construction of the folder relationships in FIG. 5C. Otherwise, the process continues with the interrogation step of 114.

Returning to step 118, if a match is found with the characteristics of the current sample with the transposition rules, the operating system of called up in step 124 to create a new segment object. Step 126 then copies the data between the fixed and dynamic pointers into memory, thus defining a new segment object. Next, step 128 stores the particular characteristic determined in step 118 as the defining attribute of the new segment object. If this is the end of the audio object in step 130, the process continues with FIG. 5C. If not, the fixed cursor is advanced to the dynamic cursor in step 132 and the dynamic cursor is advanced by one sample. The process then loops to continue with the next interrogation.

Referring now to FIG. 5C, the process of establishing the folder relationships is depicted. Steps 136 and 138 set the fixed and dynamic pointers to the start of the audio object. The segment object attributes stored in Step 128 are then read into memory in step 140. Step 142 advances the dynamic cursor to the start of the next defined segment. If no segment is found in step 144, the process is complete. If a segment is found, steps 146, 148 and 150 establish the folder structure. The specific attributes of the segment are read into memory in step 146. Steps 148 and 150 then interrogate the attributes of the present segment and all previous segments then apply the rules to write the folder attributes, whether peer or hierarchical. The process continues by advancing the dynamic cursor to the next segment in the audio object.

Figure 6:
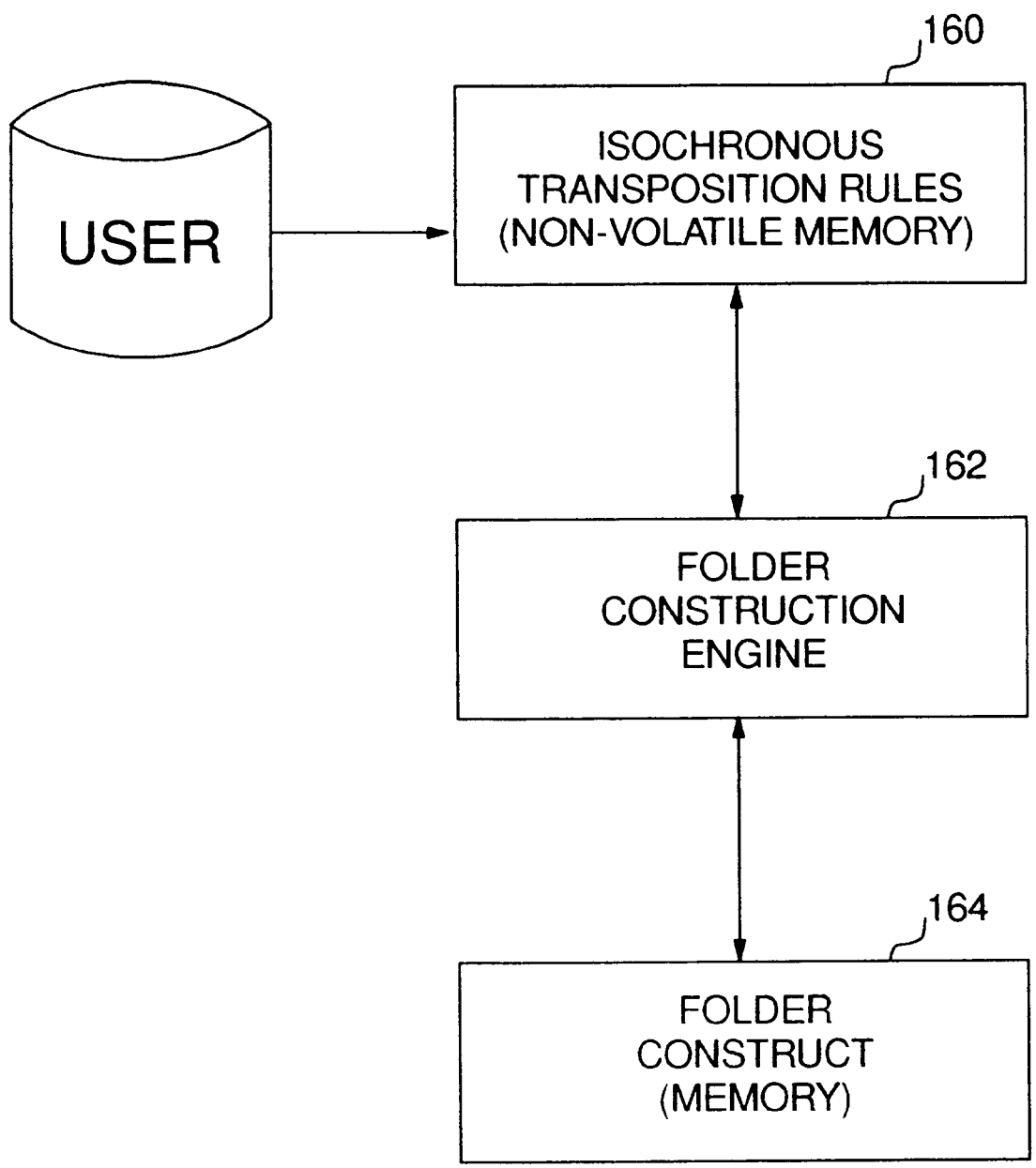
FIG. 6 depicts a preferred apparatus for carrying out the present invention.

FIG. 6 depicts the currently preferred embodiment of carrying out the present invention. This device provides an apparatus for processing a digital audio signal. The apparatus comprises primarily three major components: (a) means for establishing a set of isochronous transposition rules regarding prospective characteristics of a audio object in non-volatile memory 160; (b) volatile memory 164 for containing a folder construct as previously described; and (c) a folder construction engine 162. As shown, the engine is coupled to the memory 160 and to the volatile memory 164. The folder construction engine comprises a means for interrogating an audio object for salient characteristics of the object; a means for comparing the salient characteristics of the object with the isochronous transposition rules; means for creating a plurality of segment objects from the audio object based upon the step of comparing; and means for arranging the segmented object into a hierarchical structure based upon the length of each of said plurality of segments.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

We claim:

1. A method of arranging a folder structure from an audio object defining a plurality of isochronous characteristics, comprising the steps of:
   a. defining by a user one of said plurality of isochronous characteristics;
   b. identifying the locations of the user defined characteristic within the object;
   c. segmenting the audio object into a plurality of segments based upon the location of the user defined characteristic within the object, each segment defining a length between the locations of the user defined characteristic; and
   d. arranging the segmented object into a hierarchical structure based upon the length of each of said plurality of segments.

2. A method of segmenting an audio object comprising the steps of:
   a. defining by a user a set of isochronous transposition rules regarding prospective characteristics of an audio object;
   b. interrogating an audio object for salient characteristics of the object;
   c. comparing the salient characteristics of the object with the user defined isochronous transposition rules;
   d. creating a plurality of segment objects from the audio object based upon the step of comparing.

3. A method of processing a digital audio signal comprising the steps of:
   a. defining by a user a set of isochronous transposition rules regarding prospective characteristics of a audio object;
   b. interrogating an audio object for salient characteristics of the object;
   c. comparing the salient characteristics of the object with the user defined isochronous transposition rules;
   d. creating a plurality of segment objects from the audio object based upon the step of comparing; and
   e. arranging the segmented object into a hierarchical structure based upon the length of each of said plurality of segments.

4. Apparatus for processing a digital audio signal comprising:
   a. means for defining by a user a set of isochronous transposition rules regarding prospective characteristics of a audio object;
   b. volatile memory for containing a folder construct; and
   c. a folder construction engine operatively coupled to the means for defining a set of isochronous transposition rules and further operatively coupled to the volatile memory for containing a folder construct, the engine comprising
      i. means for interrogating an audio object for salient characteristics of the object;
      ii. means for comparing the salient characteristics of the object with the user defined isochronous transposition rules;
      iii. means for creating a plurality of segment objects from the audio object based upon the step of comparing; and
      iv. means for arranging the segmented object into a hierarchical structure based upon the length of each of said plurality of segments.

* * * * *